Aug. 2, 1949.                    L. SWEET                    2,477,705
               INSTRUMENT HOUSING AND CLOSURE
                   FASTENING DEVICE THEREFOR
                       Filed May 4, 1946
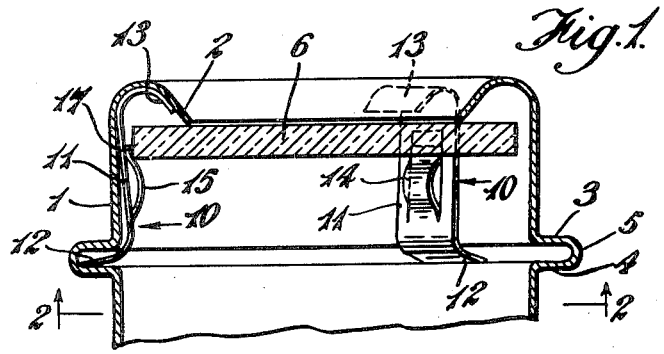
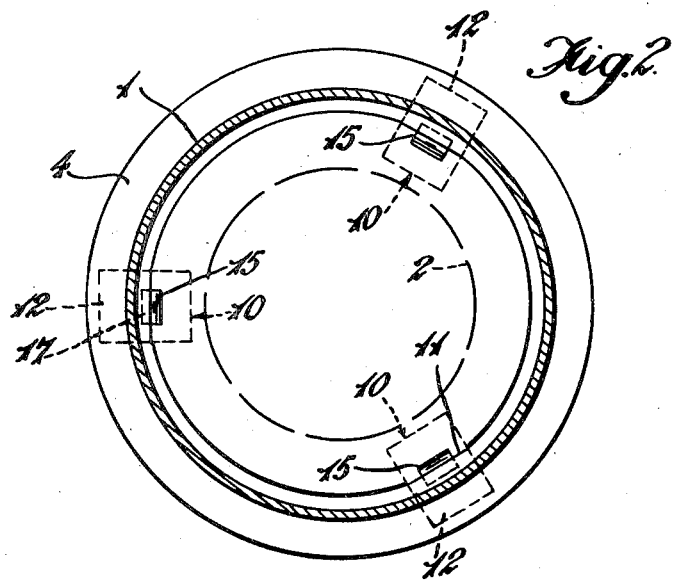
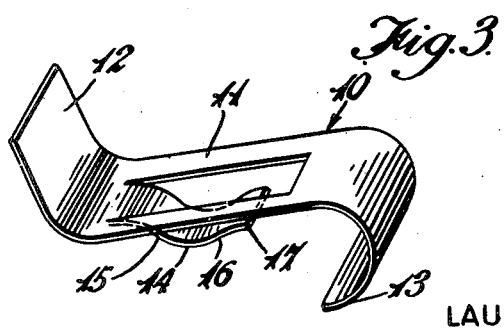
INVENTOR.
LAURIE SWEET.

Patented Aug. 2, 1949

2,477,705

UNITED STATES PATENT OFFICE 2,477,705

INSTRUMENT HOUSING AND CLOSURE FASTENING DEVICE THEREFOR

Laurie Sweet, London, England, assignor to Tinnerman Products, Inc., Cleveland, Ohio, a corporation of Ohio Application May 4, 1946, Serial No. 667,401
In Great Britain May 16, 1945

7 Claims. (Cl. 220—55)

1

This invention relates to a one-piece fastening device of sheet material which is more especially intended for retaining glass panes or other end closure members in instrument cases or housings but which may be employed as a fastener of general utility for securing to one member a second transversely extending member. The invention comprises not only the fastener per se but also an assembly of parts secured by the present fastener.

The fastening device according to my invention comprises a body portion that is formed to engage a housing or other part and to be held attached thereto by spring tension, and a yieldable arm which extends from one side of the body portion and which provides a cam surface, and which also provides an abutment, preferably in the form of an oppositely extending abutment surface, at the free end portion of the arm, the arrangement being such that, when the fastener is secured to a housing or other part and a second part is moved longitudinally of the first part to engage the cam surface of the arm of the fastener, the said arm yields to allow the second part to pass beyond the cam surface and the abutment of the arm to spring into engagement with the second part. A second abutment is provided either by the body portion of the fastener or by the first part, and this abutment cooperates with the abutment of the yieldable arm to secure the second part in position on the first part.

An instrument case having a glass pane or other closure member secured at one end of the case (hereinafter referred to as the upper end) by one form of fastener will now be described with reference to the accompanying drawing, in which Fig. 1 is a partial longitudinal sectional view of the instrument case; Fig. 2 is a section taken on the line 2—2 of Fig. 1, and Fig. 3 is a perspective view of one of the fasteners shown in Figs. 1 and 2.

The instrument case shown in the drawing comprises a sheet metal side wall 1 of generally cylindrical configuration having at its upper end a reversely bent portion providing an oblique downwardly and inwardly extending annular flange 2. The sheet metal side wall has an intermediately disposed outwardly extending corrugation providing spaced upper and lower annular flanges 3 and 4 joined at their outer ends by a web portion 5. In the form shown in the drawing, three identical fasteners, which are indicated generally by the reference numeral 10, are employed for securing the closure member 6 to the case 1. The fasteners are formed of resilient metal strip and each fastener has a body portion comprising an intermediate base portion 11, an outwardly extending leg portion 12 at its lower end and an inwardly extending reversely bent head portion 13 at its upper end. The leg portion 12 is adapted to be received within the corrugation provided by the side wall of the instrument case while the head portion 13 is adapted to be seated snugly within the flange 2 at the top of the instrument case. The body portion of the fastener is of such length relatively to the distance between the flange 2 at the top of the instrument case and the lower flange 4 formed by the corrugation that, with the head portion 13 of the fastener body seated against the flange 2, the base portion 11 of the fastener has to be bowed inwardly slightly to allow the leg portion 12 of the fastener body to enter the corrugation. Thus, when the leg portion 12 is inserted within the channel formed by the corrugation, the body portion of the fastener is tensioned and the fastener is held firmly attached by spring tension to the instrument case.

Struck and formed from the base 11 of the body portion of the fastener to extend inwardly thereof is an arm 14 which is connected to base adjacent the lower end thereof. This arm extends obliquely to the base portion to form a cam surface 15 and is then bent abruptly to extend in the opposite direction to form an abutment surface 16. The free end portion of the arm is in the form of a lip 17 extending substantially parallel to the base portion of the fastener.

In securing the circular closure member 6 to the instrument case, the fasteners are first attached to the side wall 1 of the case by placing the head portion 13 of each fastener body within the flange 2 at the top of the case and springing the leg portion 12 into the channel provided by the corrugation in the side wall 1. With the fasteners so secured to the case, the closure member 6 is then inserted within the case and pushed upwardly until it engages the cam surfaces 15 provided by the arms 14 of the fasteners. On further upward movement of the closure member each arm 14 is cammed outwardly, being elongated and flattened against the base 11 of the fastener body with the lip portion 17 sliding on the base, and the closure member passes over the hump of each arm. As soon as the closure member passes over the hump each arm tends to return to its untensioned condition and the abutment surface 16 on the arm springs into engagement with the lower edge of the closure member. In this position of the closure member the upper surface thereof engages either the free end of the flange 2 at the top of the case, as shown in the drawing, or the free end of the head portion 13 of each fastener body so that the closure member is clamped and held securely in position at the top of the case.

Any desired number of fasteners, suitably spaced apart, may be attached to the instrument case and it will be understood that removal of the closure member may be readily effected merely by manual flattening of the arms of the fasteners against the base of the body portion thereof. Since the abutment surface 16 on the arm of each fastener extends obliquely to the base of the fastener body, the same fastener may be used with closure members of different thickness. The fastening will also compensate automatically for any slight variation in the diameter of the closure member.

I claim:

1. A housing assembly including a housing, a one-piece fastening device of sheet material having a body portion with oppositely bent ends and a yieldable arm intermediate thereon extending laterally from said body portion, a closure member for said housing, a reversely bent end portion in said housing, one bent end of the fastening device being shaped complementary to the reversely bent end portion of the housing, said housing having an intermediate outwardly extending flanged corrugation spaced from the reversely bent end of the housing and adapted to receive the other bent end of the fastening device, said yieldable arm having a cam surface and an abutment surface, said closure member having such size that it may simultaneously engage the housing flange and the yielding arm, whereby the closure member when moved longitudinally of the housing beyond the cam surface becomes seated and locked in engagement with the housing by the abutment surface.

2. The combination with a housing of a one-piece fastening device of sheet material comprising a body portion secured by spring tension to the housing, a closure member for said housing, said housing having a side wall and an inwardly bent end portion provided with an oblique downwardly and inwardly extending annular flange, said side wall having an outwardly extending annular corrugation spaced from said flange, the fastening device having an end portion bent to seat against said inwardly bent end portion of the housing and the opposite end portion of the fastener bent to be inserted into the corrugation, a yieldable arm extending laterally from the body portion and intermediate thereon provided with a cam and an abutment surface, said closure member having such size that it may simultaneously engage the housing flange and the yielding arm, whereby the closure member being moved longitudinally of the housing beyond the cam surface is locked in spring engagement with the housing flange by the abutment surface.

3. A fastening device of the character described for securing a closure member to a housing assembly comprising a resilient strip of sheet material having a substantially S-shaped body portion providing oppositely projecting end portions and a yieldable arm intermediate thereof, said yieldable arm extending laterally to one side of the body portion and having a cam and an abutment surface at the free end portion thereof, said housing assembly provided with a side wall having an inwardly bent end portion substantially conforming to the shape of one end portion of said strip and having an outwardly extending flanged corrugation spaced from said inwardly bent end portion, said strip attached by spring tension to the housing assembly and positioned against said housing assembly with one end portion of the strip seated against the inwardly bent end portion of the housing and the opposite end portion of the strip inserted into the flanged corrugation, said closure member within the confines of the housing assembly adapted to be moved longitudinally of the housing beyond the cam surface to rest securely upon the abutment surface of the yieldable arm.

4. A fastening device of the character described for securing a closure member to a housing assembly, comprising a resilient strip of sheet material having a body portion provided with oppositely projecting end portions, and a yieldable arm intermediate thereof, said yieldable arm extending laterally to one side of the body portion and having a free end portion providing a cam and an abutment surface thereon, said housing assembly having surfaces substantially conforming to the shape of said strip and provided with a side wall having an intermediate outwardly extending flanged corrugation, said strip being attached by spring tension and positioned against the housing assembly with one end portion of the fastener seated in the end portion of the housing assembly and the opposite end portion of the fastener inserted into the flanged corrugation, said closure member contained within the confines of said housing and adapted to be moved longitudinally of the housing beyond the cam surface to lock securely upon the abutment surface of the yieldable arm.

5. A device of the character described comprising a housing having a side wall and an inwardly and downwardly bent end portion containing an aperture, a plurality of fasteners of sheet material having body portions engaging said housing at spaced intervals and each having a bent over top portion formed to seat within the housing space outside of said downwardly bent end portion of the housing, a closure member slidable longitudinally of the housing within said housing, each fastener having a yieldable arm attached at one end to said body portion while free to move at its other end independently of said bent-over top portion and convexed inwardly to provide both a cam adapted to be engaged by the closure member as it moves into position and an abutment surface, adapted to engage said closure member and serving to maintain said closure member in locked position to close the aperture except when pressure is manually exerted upon said member opposite the closure pressure.

6. The combination of a housing having an inwardly projecting flange and an outwardly extending corrugation spaced longitudinally from the flange, a closure member adapted to occupy the housing with one face adapted to engage the flange, and a set of fastener members adapted to be carried by the housing and act on the closure member to hold it in such engagement, each fastener member being of substantially S-shape with an elongated intermediate portion, one end of the S occupying the corrugation and the other bearing against the adjacent face of the flange, the elongated intermediate portion of each fastener having an inwardly projecting spring arm adapted to engage the closure member.

7. A fastening device comprising a one-piece strip of sheet metal having a body portion, one end of the body being reversely bent laterally and terminating well short of the opposite end of the body, the other end of the body being bent laterally in the opposite direction therefrom, and a yieldable arm integral with the body portion and disposed intermediate said laterally extending portion, the arm extending from the body in the same direction from the body as one of the laterally extending end portions, and then extending toward the body, that portion of the arm attached to the body and adapted to operate as a cam surface and the free end of the return bend adapted to operate as an abutment against which an article to be supported may engage.

LAURIE SWEET.

REFERENCES CITED

The following references are of record in the file of this patent:

UNITED STATES PATENTS

| Number | Name | Date |
| --- | --- | --- |
| 494,855 | Goodyear, Jr. | Apr. 4, 1893 |
| 788,252 | Dalton | Apr. 25, 1905 |
| 1,515,156 | Michel | Nov. 11, 1924 |